(12) United States Patent
Dunn et al.

(10) Patent No.: US 8,708,391 B2
(45) Date of Patent: Apr. 29, 2014

(54) LINER SYSTEMS

(75) Inventors: Donald C. Dunn, Mesa, AZ (US); Jerry F. Hofberger, Mesa, AZ (US)

(73) Assignee: Corrosion Engineering, Inc., Mesa, AZ (US)

( * ) Notice: Subject to any disclaimer, the term of this patent is extended or adjusted under 35 U.S.C. 154(b) by 153 days.

(21) Appl. No.: 13/010,492

(22) Filed: Jan. 20, 2011

(65) Prior Publication Data
US 2011/0181067 A1 Jul. 28, 2011

Related U.S. Application Data

(60) Provisional application No. 61/298,116, filed on Jan. 25, 2010, provisional application No. 61/322,822, filed on Apr. 10, 2010.

(51) Int. Cl.
*B62D 33/00* (2006.01)

(52) U.S. Cl.
USPC ....................................................... 296/39.2

(58) Field of Classification Search
USPC .................................. 296/39.2, 183.2, 183.1
See application file for complete search history.

(56) References Cited

U.S. PATENT DOCUMENTS

| | | | | |
|---|---|---|---|---|
| 2,957,261 A * | 10/1960 | Moskowitz | ...................... | 40/600 |
| 3,110,371 A * | 11/1963 | De Ridder | .................... | 52/588.1 |
| 3,111,728 A * | 11/1963 | Alderfer | ...................... | 49/478.1 |
| 3,578,375 A * | 5/1971 | Finefrock | .................... | 296/39.2 |
| 3,652,123 A * | 3/1972 | Speers | ........................ | 296/183.1 |
| 3,913,851 A | 10/1975 | Andersson | | |
| 4,529,660 A * | 7/1985 | Heim | .......................... | 428/423.1 |
| 4,592,583 A * | 6/1986 | Dresen et al. | ................. | 296/39.2 |
| 4,909,559 A | 3/1990 | Zettle | | |
| 5,511,822 A | 4/1996 | Wolanski | | |
| 5,803,531 A * | 9/1998 | Nielsen | ....................... | 296/184.1 |
| 5,806,909 A * | 9/1998 | Wise | .......................... | 296/39.1 |
| 5,851,043 A * | 12/1998 | Moutrey et al. | ............... | 296/39.2 |
| 6,000,741 A * | 12/1999 | Reynolds et al. | ............ | 296/39.2 |
| 6,022,068 A * | 2/2000 | D'Amico | .................... | 296/183.2 |
| 6,027,057 A * | 2/2000 | Miles | ........................... | 241/182 |
| 6,128,815 A | 10/2000 | Jurica et al. | | |
| 6,129,409 A * | 10/2000 | D'Amico | .................... | 296/183.2 |
| 6,174,014 B1* | 1/2001 | Hook et al. | ................... | 296/39.2 |
| 6,303,241 B1* | 10/2001 | Miles | ............................ | 428/812 |
| 6,305,731 B1* | 10/2001 | Hook et al. | ................... | 296/39.2 |
| 6,345,858 B1* | 2/2002 | Franklin et al. | ............ | 296/183.1 |
| 6,592,171 B1* | 7/2003 | Hinds | .......................... | 296/183.2 |
| 6,832,691 B2 | 12/2004 | Miles et al. | | |
| 6,854,808 B2* | 2/2005 | Kostecki | ........................... | 298/7 |
| 7,025,407 B2* | 4/2006 | Medel | ......................... | 296/183.2 |
| 7,032,957 B2* | 4/2006 | Miller et al. | ................ | 296/183.2 |
| 7,100,256 B2* | 9/2006 | D'Amico et al. | ............ | 29/401.1 |
| 7,207,621 B2* | 4/2007 | D'Amico et al. | .......... | 296/183.1 |

(Continued)

FOREIGN PATENT DOCUMENTS

| | | |
|---|---|---|
| JP | 2004051029 A | 2/2004 |
| KR | 2000-0009507 A | 2/2000 |
| WO | WO0032500 A1 | 6/2000 |

*Primary Examiner* — Kiran B Patel (74) *Attorney, Agent, or Firm* — Stoneman Law Patent Group; Martin L. Stoneman; David A. Spellman (57) ABSTRACT

A system relating to lining heavy-material hauling and processing equipment comprising a plurality of magnetically attached liner panels installed without the need to drill or otherwise alter the truck bed or device being lined.

17 Claims, 5 Drawing Sheets

(56) References Cited

U.S. PATENT DOCUMENTS

| | | | |
|---|---|---|---|
| 7,416,236 B2 * | 8/2008 | Boddie et al. | 296/39.2 |
| 7,434,868 B2 * | 10/2008 | D'Amico et al. | 296/183.1 |
| 7,481,483 B2 * | 1/2009 | D'Amico et al. | 296/183.1 |
| 7,618,075 B2 * | 11/2009 | Boddie et al. | 296/39.2 |
| 8,141,928 B2 * | 3/2012 | Zamorano Jones | 296/39.2 |
| 8,287,791 B2 * | 10/2012 | Stackpole | 264/271.1 |
| 2003/0138620 A1 * | 7/2003 | Fonseca | 428/317.1 |
| 2004/0182865 A1 | 9/2004 | Wilkins et al. | |
| 2006/0204691 A1 | 9/2006 | Lyublinski et al. | |

\* cited by examiner

FIG. 5

LINER SYSTEMS

CROSS-REFERENCE TO RELATED APPLICATION

The present application is related to and claims priority from prior provisional application Ser. No. 61/298,116, filed Jan. 25, 2010, entitled "LINER SYSTEMS"; and, this application is related to and claims priority from prior provisional application Ser. No. 61/322,822, filed Apr. 10, 2010, entitled "LINER SYSTEMS", the contents of all of which are incorporated herein by this reference and are not admitted to be prior art with respect to the present invention by the mention in this cross-reference section.

BACKGROUND

This invention relates to providing a system for improved liners used on heavy machinery such as, for example, heavy material hauling portions of vehicles and machines used in mining operations. More particularly, this invention relates to providing a system for improving the installation of heavy-material hauling vehicle liners and processing equipment liners so as to avoid having to permanently alter or damage the heavy-material hauling vehicle or processing equipment. One of the problems with prior art liner panels is they are installed with bolts that require drilling of the equipment liner bed and, therefore, cause at least some damage to the bed to install a liner panel. Furthermore, replacement of a bolted-in liner panels requires a maintenance period when the vehicle cannot be used as well as alignment of bolt patterns used in the initial installation.

OBJECTS AND FEATURES OF THE INVENTION

A primary object and feature of the present invention is to provide a system overcoming the above-mentioned problem(s).

It is a further object and feature of the present invention is to provide such a system that improves the wear, durability and performance of bed liners for heavy material haulers.

It is a further object and feature of the present invention to provide such system that improves the wear, durability and performance of liners for heavy-material processing equipment, particularly used in the mining industry.

It is a further object and feature of the present invention to provide such a system that installs without the need to alter, drill, or damage the vehicle or equipment.

It is a further object and feature of the present invention to provide such a system that installs without the need to alter, drill or damage a vehicle heavy-material hauling bed.

It is a further object and feature of the present invention to provide such a system that installs magnetically without breaking free during normal use of the liner.

It is a further object and feature of the present invention to provide such a system that assists replacing liners with minimal equipment "down-time" and reduced labor costs associated with such maintenance.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, relating to providing replaceable wear surfaces on abrasive-material handling-equipment, comprising: at least one replaceable surface structured and arranged to provide at least one replaceable surface onto the abrasive-material handling-equipment; wherein such at least one replaceable surface comprises at least one wear-resister element structured and arranged to resist wear of such at least one replaceable surface; wherein such at least one replaceable surface comprises at least one magnet structured and arranged to magnetically attach such at least one replaceable surface to the abrasive-material handling-equipment; and wherein such at least one magnet comprises at least one permanent attacher structured and arranged to permanently attach with such at least one replaceable surface. Moreover, it provides such a system wherein such at least one permanent attacher comprises a single integral-matrix bond structured and arranged to integrally-matrix bond such at least one magnet with such at least one replaceable surface. Additionally, it provides such a system wherein such at least one wear-resister element comprises at least one ceramic element structured and arranged to increase wearability of such at least one replaceable surface. Also, it provides such a system further comprising: at least one vehicle, having at least one ferromagnetic surface, structured and arranged to handle abrasive material; wherein such at least one vehicle comprises at least one container portion structured and arranged to contain the abrasive material; wherein such at least one container portion comprises such at least one ferromagnetic surface; and wherein such at least one container portion comprises at least one of such replaceable wear surface magnetically attached to such at least one ferromagnetic surface. In addition, it provides such a system wherein such integral-matrix bond comprises at least one elastomeric material.

And, it provides such a system wherein such integral-matrix bond comprises rubber. Further, it provides such a system wherein such at least one elastomeric material comprises rubber. Even further, it provides such a system wherein such at least one magnet comprises a plurality of magnets. Moreover, it provides such a system wherein such plurality of magnets comprises a plurality of ceramic magnets. Additionally, it provides such a system wherein such plurality of magnets comprises at least six ceramic magnets structured and arranged in at least one aligned polarity so as to increase the magnetic attaching of such at least one replaceable surface to the abrasive-material handling-equipment. Also, it provides such a system wherein such wear-resistant element comprises a rubber thickness of between about one inch and about twelve inches.

In addition, it provides such a system wherein: such plurality of magnets is situate opposite such at least one ceramic element. And, it provides such a system further comprising: at least one vehicle, having at least one ferromagnetic surface, structured and arranged to handle abrasive material; wherein such at least one vehicle comprises at least one container portion structured and arranged to contain the abrasive material; wherein such at least one container portion comprises such at least one ferromagnetic surface; and wherein such at least one container portion comprises at least one of such replaceable wear surface magnetically attached to such at least one ferromagnetic surface.

In accordance with another preferred embodiment hereof, this invention provides a system, relating to providing replaceable wear surfaces on abrasive-material handling-equipment, comprising: replaceable surface means for providing at least one replaceable surface; wherein such replaceable surface means comprises wear-resister element means for resisting wear of such replaceable surface means when handling the abrasive material; wherein such replaceable surface means comprises magnet means for magnetically attaching such replaceable surface means to the equipment handling abrasive material; and wherein such magnet means comprises permanent attacher means for permanently attaching with such replaceable surface means. Further, it provides such a system wherein such permanent attacher means comprises integral-matrix bond means for integral-matrix bonding of such magnet means with such replaceable surface means. Even further, it provides such a system wherein such wear-resister element means comprises ceramic element means for increasing wearability of such replaceable surface means.

In accordance with another preferred embodiment hereof, this invention provides a system, relating to providing replaceable wear surfaces on abrasive-material handling-equipment, comprising: at least one replaceable surface structured and arranged to provide at least one replaceable surface onto the abrasive-material handling-equipment; wherein such at least one replaceable surface comprises at least one wear-resister element structured and arranged to resist wear of such at least one replaceable surface; wherein such at least one replaceable surface comprises at least one magnet structured and arranged to magnetically attach such at least one replaceable surface to the abrasive-material handling-equipment; and wherein such at least one magnet comprises at least one permanent attacher structured and arranged to permanently attach with such at least one replaceable surface. Even further, it provides such a system wherein such at least one permanent attacher comprises a single integral-matrix bond structured and arranged to integrally-matrix bond such at least one magnet with such at least one replaceable surface.

Even further, it provides such a system wherein such at least one wear-resister element comprises at least one ceramic element structured and arranged to increase wearability of such at least one replaceable surface. Even further, it provides such a system wherein: such integral-matrix bond comprises rubber; and such at least one magnet comprises a plurality of ceramic magnets.

In accordance with another preferred embodiment hereof, this invention provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1A:
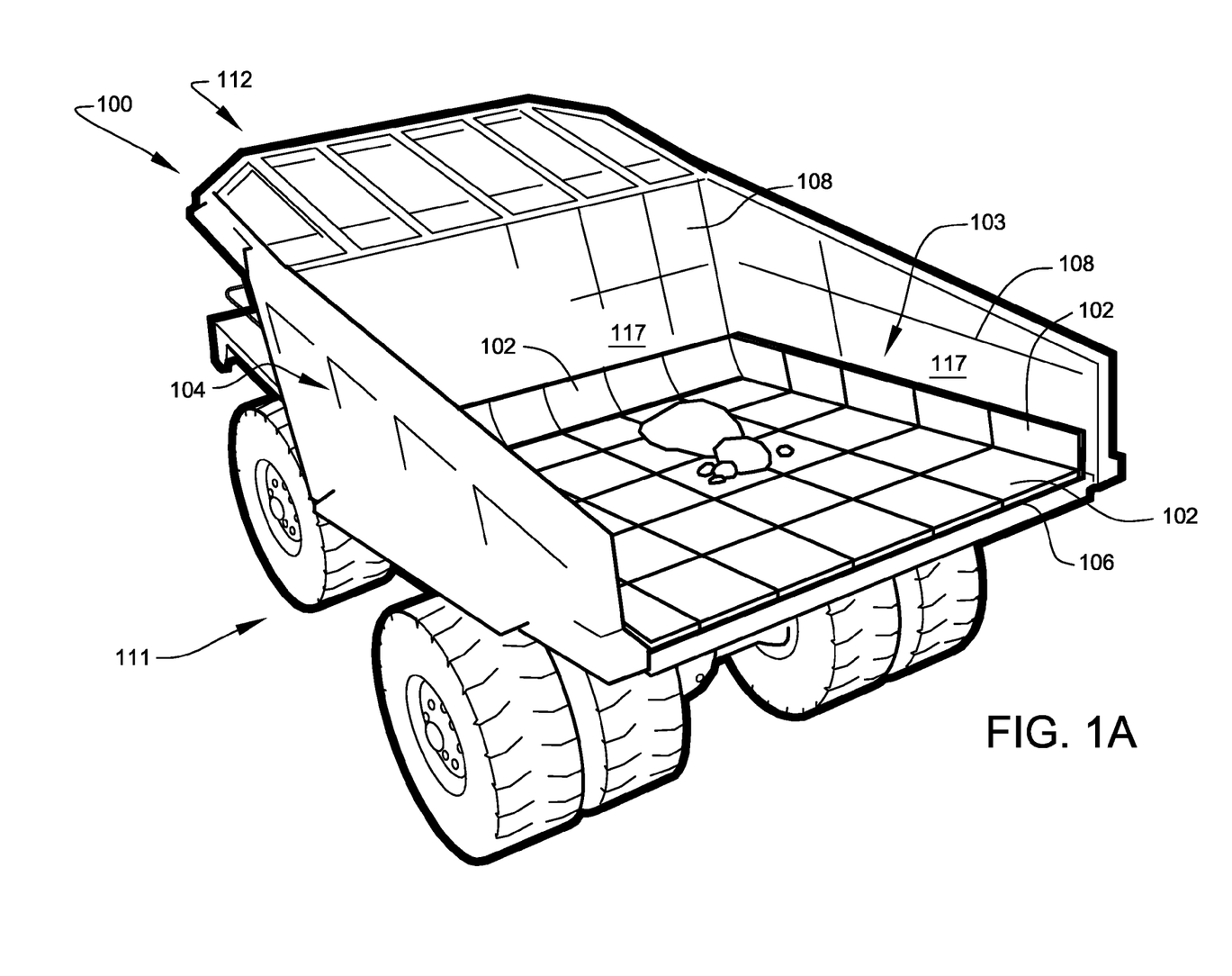
FIG. 1A shows a perspective view, illustrating a truck bed equipped with liner panels of the liner systems, according to a preferred embodiment of the present invention.

FIG. 1A shows a perspective view, illustrating a truck bed 104 equipped with liner panels 102 of the liner systems 100, according to a preferred embodiment of the present invention.

Figure 1B:
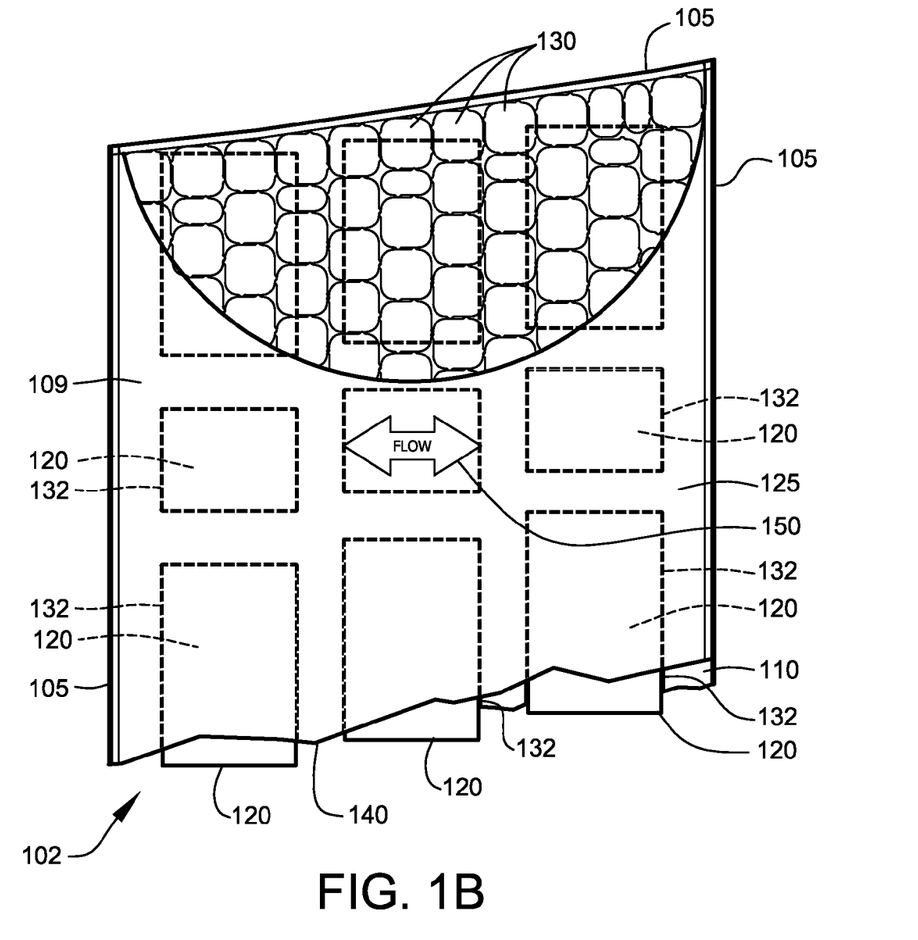
FIG. 1B shows a top view, partially in section, illustrating a liner panel of the liner systems, according to the preferred embodiment of FIG. 1.
Figure 2:
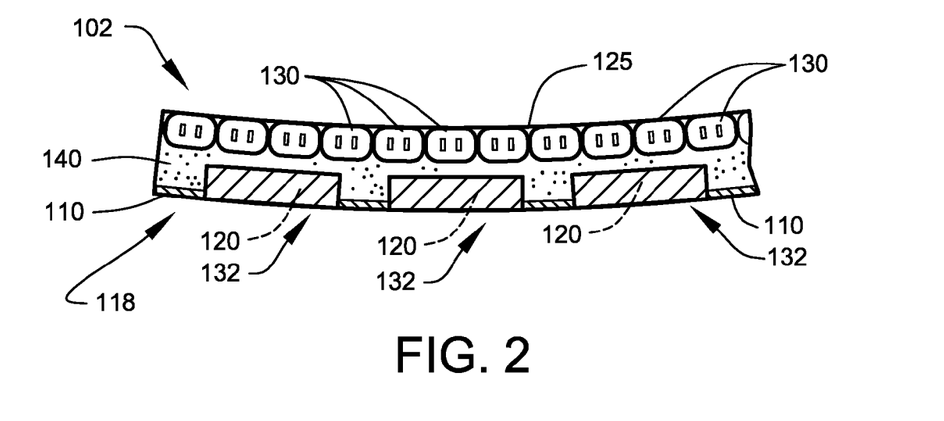
FIG. 2 shows an end section view, of a radius-liner panel according to the preferred embodiment of FIG. 1.
Figure 3:
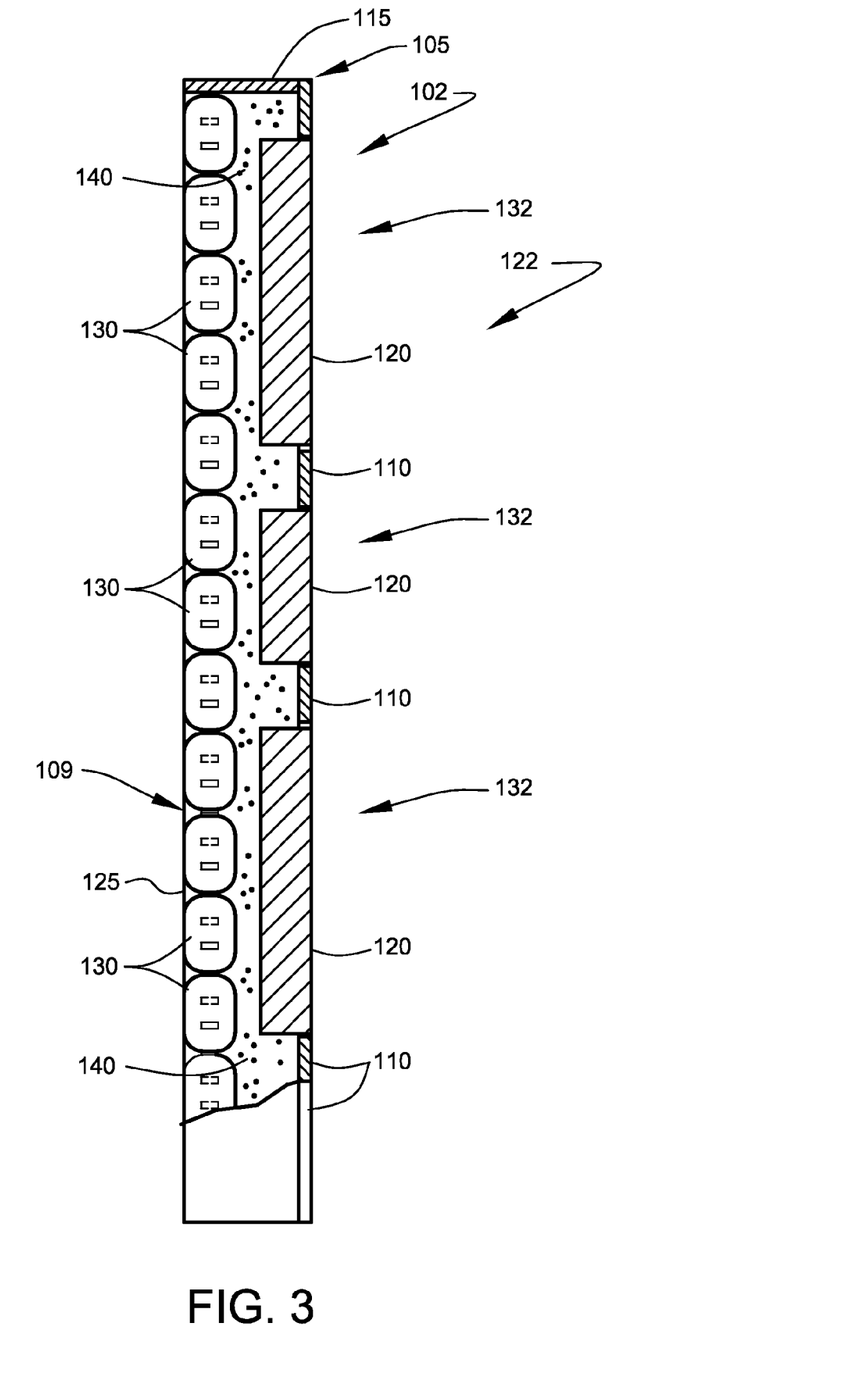
FIG. 3 shows a side section view, of a squared-edge liner panel, according to the preferred embodiment of FIG. 1.

FIG. 1B shows a top view, partially in section, illustrating a liner panel 102 of the liner systems 100, according to a preferred embodiment of the present invention. FIG. 2 shows an end section view, of radius-liner panel 118, according to the preferred embodiment of FIG. 1. FIG. 3 shows a side section view of the liner panel 102 according to another preferred embodiment of FIG. 1.

Liner panels 102 are preferably used along the surfaces of the bed bottom 106 and bed sides 108 of heavy-material hauling and processing equipment 112, preferably to provide a replaceable wear layer on such surfaces, being particularly useful for trucks and other large-bed vehicle equipment 111 used to haul heavy materials, particularly those in the mining industry. One of the problems with prior art liner panels is they are installed with bolts that require drilling of the truck bed 104 (equipment surface) and, therefore, cause at least some damage to such truck bed 104 to install a liner panel 102. Furthermore, replacement of a bolted-in liner panel requires a maintenance period when the vehicle cannot be used as well as alignment of bolt patterns used in the initial installation. The present invention provides a magnetically-attached liner panel 102 preferably installed without the need to drill or otherwise alter the truck bed 104 being lined or be concerned with bolt-hole patterns. Furthermore, the present invention provides a ceramic reinforced rubber wear layer 125 to improve the wearability and longevity-of-use of the magnetically-attached liner panel 102.

Liner panels 102 (at least embodying herein at least one replaceable surface structured and arranged to provide at least one replaceable surface onto the abrasive-material handling-equipment; and, at least embodying herein replaceable surface means for providing at least one replaceable surface) of the system are preferably configured to conform to the geometry of the surfaces to which they are applied, and therefore preferably comprise a range of sizes and shapes. In one preferred embodiment of the system, liner panel 102 preferably comprises a radius-liner panel 118 for lining a non-linear, preferably arced surface, as shown, or, alternately preferably, comprises a squared-edge liner panel 122 for lining a linear surface, as shown. Whether radius (curved) or linear (flat), liner panel 102 preferably comprises at least one frame portion 105, preferably comprising a bottom portion 110, side portions 115 and a top portion 109. Bottom portion 110 (the side that couples to the vehicle/device) preferably comprises a steel plate, preferably comprising at least one, and preferably multiple, "punch-out" aperture portions 132 within which peripheries magnetic coupling element(s) 120 is/are placed, as shown. Bottom portion 110 containing magnetic coupling element(s) 120, Liner panel 102 preferably comprises at least one wear layer 125, preferably a ceramic-rubber wear layer 125, preferably placed about parallel to the bottom portion 110. Upon reading this specification, those with ordinary skill in the art will now appreciate that, under appropriate circumstances, considering such issues as design preference, user preferences, marketing preferences, cost, structural requirements, available materials, technological advances, etc., other ceramic wear-layer placement arrangements such as, for example, multiple levels, non-parallel, serpentine, etc., may suffice.

Preferably, wear layer 125 comprises a layer of ceramic, preferably a plurality of ceramic cubes 130 (at least embodying herein wherein such wear-resister element means comprises ceramic element means for increasing wearability of such replaceable surface means; and, at least embodying herein wherein such at least one wear-resister element comprises at least one ceramic element structured and arranged to increase wearability of such at least one replaceable surface), as shown. Ceramic cubes 130 preferably comprise a rigid abrasion-resistant material, preferably a monolithic block of hard ceramic, as shown. Ceramic cubes 130 preferably comprise outer dimensions of about one and one-half-inch square by about one-inch thick. Preferably, each respective ceramic cube 130 comprise a spacer, to assist arrangement as a continuous layer of ceramic by abutting the ceramic cubes 130 into ceramic-rubber wear layer 125 (at least embodying herein wherein such replaceable surface means comprises wear-resister element means for resisting wear of such replaceable surface means when handling the abrasive material; and, at least embodying herein wherein such at least one replaceable surface comprises at least one wear-resister element structured and arranged to resist wear of such at least one replaceable surface) and preferably leave room around such ceramic cubes for rubber encapsulation to hold ceramic-rubber wear layer 125 together, as shown and described herein. Further, while rubber is the preferred encapsulate, upon reading this specification, those with ordinary skill in the art will now appreciate that, under appropriate circumstances, considering such issues as design preference, user preferences, marketing preferences, cost, structural requirements, available materials, technological advances, etc., other encapsulate materials such as, for example, polyurethane, carbon-fiber compositions, other elastomeric compositions, etc., may suffice.

The plurality of ceramic cubes 130 preferably are fully encased in elastomeric material, preferably an integral matrix, preferably rubber 140, as shown. Magnetic coupling element(s) 120 are preferably embedded within rubber 140, as shown. Magnetic coupling element(s) 120 are preferably embedded within rubber 140 to a degree sufficient to permanently attach the magnetic coupling element(s) with the ceramic reinforced rubber wear layer 125. This preferred arrangement at least embodies herein wherein such at least one replaceable surface comprises at least one magnet structured and arranged to magnetically attach such at least one replaceable surface to the abrasive-material handling-equipment; and, this arrangement at least embodies herein wherein such at least one magnet comprises at least one permanent attacher structured and arranged to permanently attach with such at least one replaceable surface; and, further this arrangement at least embodies herein wherein such replaceable surface means comprises magnet means for magnetically attaching such replaceable surface means to the equipment handling abrasive material; and, this arrangement embodies herein wherein such magnet means comprises permanent attacher means for permanently attaching with such replaceable surface means; and, this arrangement embodies herein. Upon reading this specification, those with ordinary skill in the art will now appreciate that, under appropriate circumstances, considering such issues as design preference, user preferences, marketing preferences, cost, structural requirements, available materials, technological advances, etc., other integral matrix arrangements such as, for example, polyurethane, rubber-mix compounds, plastic, carbon-fiber, metal, ceramic, etc., may suffice.

Preferably, before molding/encasing with rubber takes place, metal bottom portion 110 preferably is prepared by degreasing, sandblasting, or shot blasting in order to completely free the surface from rust and other impurities. A bonding agent is then preferably applied to specific areas of both the bottom portion 110 and magnetic coupling element(s) 120. In preferred embodiments of the liner systems 100, ceramic cubes 130 are also treated with an adhesion-enhancing primer. The rubber is then placed into the mold for forming and curing with sufficient heat and pressure (for example, steam supplied heat and hydraulic pressures upwards of about 1600 tons) to integrally bond and form a single matrix of rubber encased bottom portion 110, magnetic coupling element(s) 120, and ceramic cubes 130 thereby forming liner panel 102, as shown.

Preferably, rubber 140 is pressed into place over first the magnetic coupling element(s) 120 and then, over the plurality of ceramic cubes 130 to form a magnetically-attachable integral liner panel 102, as shown (this arrangement at least embodies herein wherein such at least one permanent attacher comprises a single integral-matrix bond structured and arranged to integrally-matrix bond such at least one magnet with such at least one replaceable surface; and, this arrangement at least embodies herein wherein such permanent attacher means comprises integral-matrix bond means for integral-matrix bonding of such magnet means with such replaceable surface means). Those with ordinary skill in the art will now appreciate that upon reading this specification and by their understanding the art of rubber attachment as described herein, methods of encasing in an integral matrix will be understood by those knowledgeable in such art.

In use, at least one or more liner panels 102 are magnetically coupled to, and installed along, the container portion 103 of a heavy hauler truck bed 104 (this arrangement at least embodies herein wherein such at least one vehicle comprises at least one container portion structured and arranged to contain the abrasive material), large-bed vehicle equipment 112 (or other user-preferred device) preferably by magnetic coupling element(s) 120 attaching to the heavy hauler truck bed which preferably comprises a ferromagnetic surface 117 (at least embodying herein at least one vehicle, having at least one ferromagnetic surface, structured and arranged to handle abrasive material), preferably steel or other magnetic-attraction material. Preferably, liner panels 102 are custom-fitted to each specific equipment dimension so as to tightly assemble in place when installed, as shown. As custom-fitting of liner panel system 100 is preferred, the exact equipment size surface area to be lined is preferably provided prior to manufacture of the liner panel system 100 to be installed on the particular vehicle or processing equipment.

Preferably, during installation, the magnetic polarity of each respective magnetic coupling element(s) 120 is oriented to assist adjacent liner panels 102 to "pull" toward each other rather than away from each other, as shown (See FIG. 1B and FIG. 4); as such, thereby increasing the overall magnetic attachment of the liner panel 102 to the truck bed (or other such equipment surface, as shown. Material flow 150 is preferably across (perpendicular to) the aligned polarity of liner panels 102, as shown. Preferably, liner panels 102 are installed in such manner to have the material flow across the aligned polarity of liner panels 102, as shown.

Depending on the use of the liner panel 102, a wear layer 125 comprising a rubber thickness of between about one inch and about twelve inches may be placed over the ceramic cubes 130. As stated above, liner panel 102 dimensions are preferably customized to a specific truck bed arrangement and may vary widely depending on application, etc. Individual panel sizes preferably range in square or rectangular pattern from about 1.5 feet by 1.5 feet to about 3 feet by 4 feet. Upon reading this specification, those with ordinary skill in the art will now appreciate that, under appropriate circumstances, considering such issues as design preference, user preferences, marketing preferences, cost, structural requirements, available materials, technological advances, etc., other dimension arrangements such as, for example, larger or smaller, other geometric arrangement, trapezoidal, triangular, etc., may suffice.

Preferably, for example, a liner panel 102 having a rectangular size of about 16 inches square would preferably comprise six ceramic magnetic coupling units 120 (at least embodying herein wherein such plurality of magnets comprises at least six ceramic magnets structured and arranged in at least one aligned polarity so as to increase the magnetic attaching of such at least one replaceable surface to the abrasive-material handling-equipment). Preferably, each respective ceramic magnetic coupling units 120 is approximately one-inch thick, four-inches wide, and six-inches long, preferably situate in aperture portions 132 and placed about one-inch inward from the perimeter of the liner panel 102, as shown. Preferably, ceramic magnetic coupling units 120 are arranged with north-south polarity, as shown. In the example arrangement above, Applicant has measured an average magnetic field of at least about 0.812 Kilogauss. Preferably, the magnetic field (holding power) of liner panel 102 is about one kilogauss averaged. Upon reading this specification, those with ordinary skill in the art will now appreciate that, under appropriate circumstances, considering such issues as design preference, user preferences, marketing preferences, cost, structural requirements, available materials, technological advances, etc., other magnetic field arrangements such as, for example, those determined by the use, ferromagnetic material content of the applicable surface, magnetic material, etc., may suffice.

Figure 4:
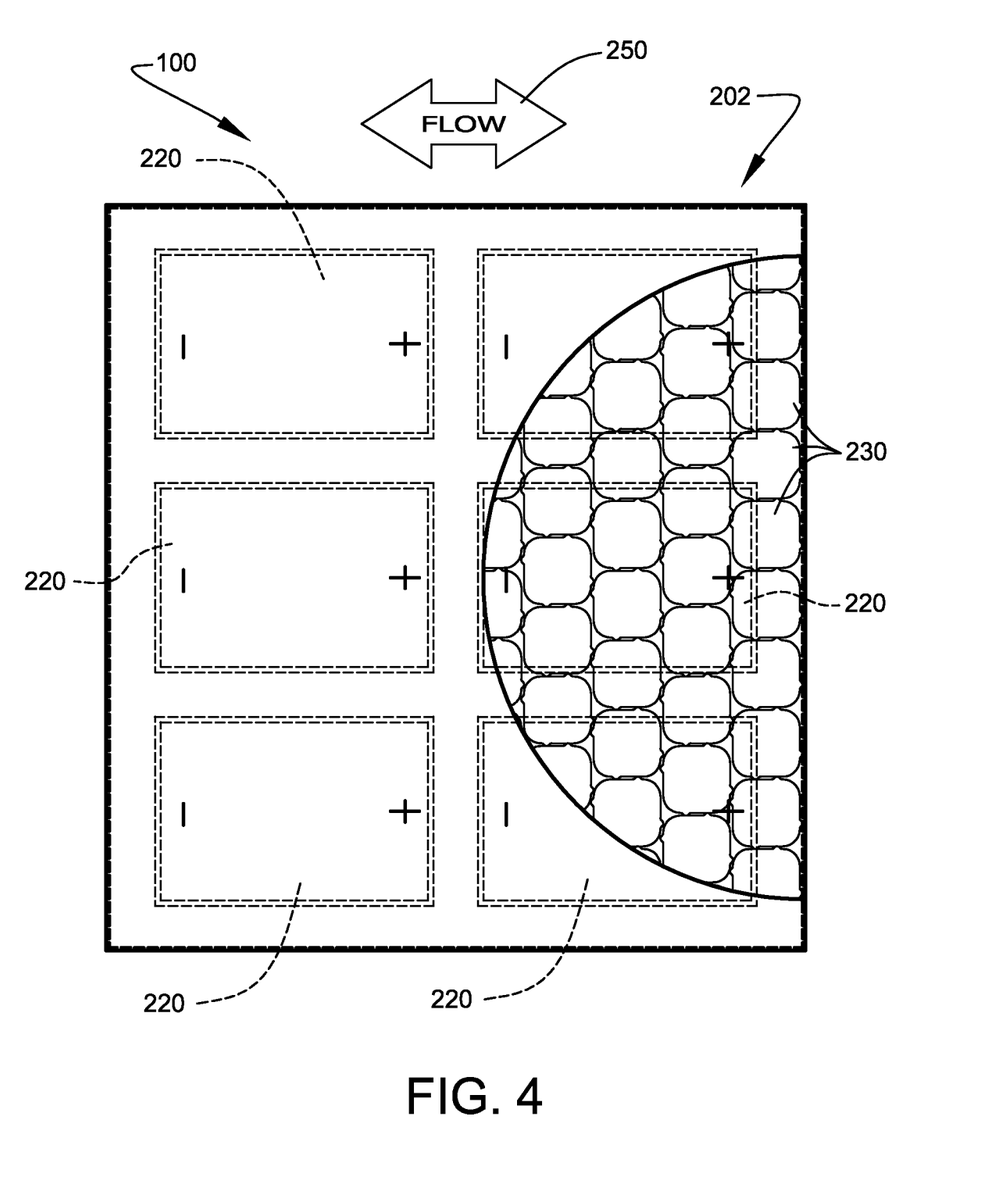
FIG. 4 shows a top view, partially in section, illustrating another liner panel of the liner systems, according to another preferred embodiment of the present invention.
Figure 5:
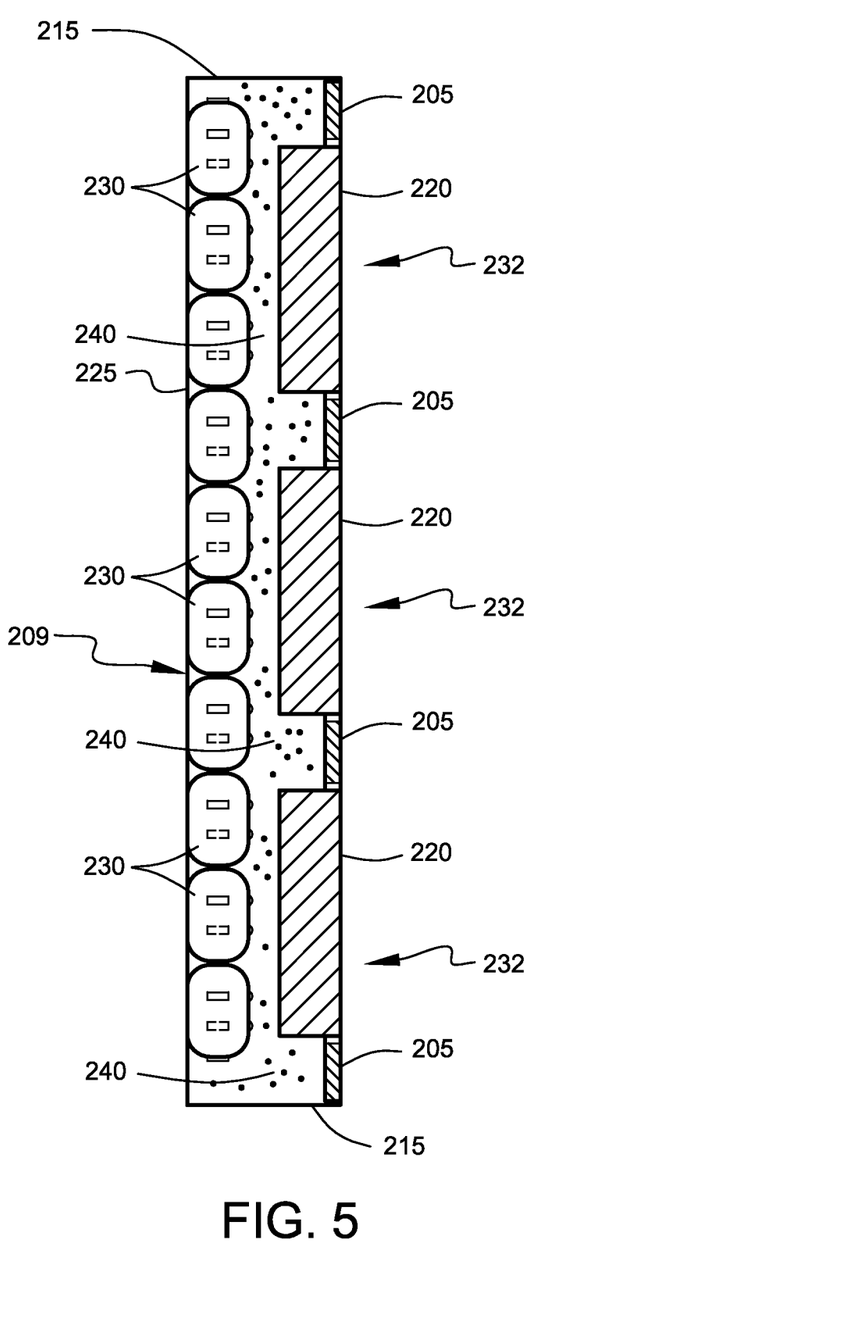
FIG. 5 shows an end section view, of the liner panel according to the preferred embodiment of FIG. 4.

FIG. 4 shows a top view, partially in section, illustrating another liner panel 202 of the liner systems 100, according to a preferred embodiment of the present invention. FIG. 5 shows an end section view, of the liner panel 202 according to the preferred embodiment of FIG. 5.

Liner panel 202 preferably comprises another preferred magnetic liner panel arrangement for lining of a heavy hauler truck bed, large-bed vehicle equipment 112 (or other user-preferred device) preferably by magnetic coupling element(s) 220 attaching to the heavy hauler truck bed which preferably comprises steel or other magnetically-attachable material. Liner panel 202 preferably comprises at least one frame 205, preferably steel, preferably comprising a bottom portion 210, side portions 215 and a top portion 209. Bottom portion 210 (the side that couples to the vehicle/device) preferably comprises at least one, and preferably multiple, "punch-out" aperture portions 232 (the side that couples to the vehicle/device) within which periphery magnetic coupling element(s) 220 is/are placed, as shown.

Liner panel 202 preferably comprises at least one wear layer 225, preferably placed parallel to the bottom portion 210 and above plurality of ceramic cubes 230, as shown.

Preferably, wear layer 225 comprises a layer of ceramic, preferably a plurality of ceramic cubes 230, as shown. Preferably, magnetic coupling element(s) 220 and the plurality of ceramic cubes 230 are fully encased in rubber. Preferably, rubber 240 is pressed into place over first the magnetic coupling element(s) 220 and then, over the plurality of ceramic cubes 230, to form a magnetically-attachable integral liner panel 202 as shown. Those with ordinary skill in the art will now appreciate that upon reading this specification and by their understanding the art of rubber encasement as described herein, methods of pressing and heating such rubber for rubber encasing will be understood by those knowledgeable in such art.

In use, at least one or more liner panels 202 are installed along the interior portion of a heavy hauler truck bed (or other user-preferred device). Preferably, the liner panels 202 are custom-fitted to each specific equipment dimension so as to tightly assemble in place when installed. Preferably, the magnetic polarity of each respective magnetic coupling element(s) 220 is placed to assist adjacent liner panels 202 to "pull" toward each other rather than away from each other thereby increasing the overall magnetic attachment of the liner panel 202 to the truck bed (or other such equipment surface); furthermore, material flow 250 is preferably across the polarity of the liner panels 202, as shown. Depending on the use of the liner panel 202, a wear layer 225 comprising a rubber thickness of between about one inch and about twelve inches may be placed over the ceramic cubes 230, as shown.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to providing replaceable wear surfaces on abrasive-material handling-equipment, comprising:
    a) at least one replaceable surface structured and arranged to provide at least one replaceable surface onto the abrasive-material handling-equipment;
    b) wherein said at least one replaceable surface comprises at least one wear-resister element structured and arranged to resist wear of said at least one replaceable surface;
    c) wherein said at least one replaceable surface comprises at least one magnet structured and arranged to magnetically attach said at least one replaceable surface to the abrasive-material handling-equipment; and
    d) wherein said at least one magnet comprises at least one permanent attacher structured and arranged to permanently attach with said at least one replaceable surface.

2. The system according to claim 1 wherein said at least one permanent attacher comprises a single integral-matrix bond structured and arranged to integrally-matrix bond said at least one magnet with said at least one replaceable surface.

3. The system according to claim 1 wherein said at least one wear-resister element comprises at least one ceramic element structured and arranged to increase wearability of said at least one replaceable surface.

4. The system according to claim 1 further comprising:
    a) at least one vehicle, having at least one ferromagnetic surface, structured and arranged to handle abrasive material;
    b) wherein said at least one vehicle comprises at least one container portion structured and arranged to contain the abrasive material;
    c) wherein said at least one container portion comprises such at least one ferromagnetic surface; and
    d) wherein said at least one container portion comprises at least one of said replaceable wear surface magnetically attached to such at least one ferromagnetic surface.

5. The system according to claim 2 wherein said integral-matrix bond comprises at least one elastomeric material.

6. The system according to claim 2 wherein said integral-matrix bond comprises rubber.

7. The system according to claim 5 wherein said at least one elastomeric material comprises rubber.

8. The system according to claim 1 wherein said at least one magnet comprises a plurality of magnets.

9. The system according to claim 8 wherein said plurality of magnets comprises a plurality of ceramic magnets.

10. The system according to claim 9 wherein said plurality of magnets comprises at least six ceramic magnets structured and arranged in at least one aligned polarity so as to increase the magnetic attaching of said at least one replaceable surface to the abrasive-material handling-equipment.

11. The system according to claim 3 wherein said wear-resistant element comprises a rubber thickness of between about one inch and about twelve inches.

12. The system according to claim 9 wherein:
a) said plurality of magnets is situate opposite at least one ceramic element.

13. The system according to claim 9 further comprising:
a) at least one vehicle, having at least one ferromagnetic surface, structured and arranged to handle abrasive material;
b) wherein said at least one vehicle comprises at least one container portion structured and arranged to contain the abrasive material;
c) wherein said at least one container portion comprises such at least one ferromagnetic surface; and
d) wherein said at least one container portion comprises at least one of said replaceable wear surface magnetically attached to such at least one ferromagnetic surface.

14. A system, relating to providing replaceable wear surfaces on abrasive-material handling-equipment, comprising:
a) replaceable surface means for providing at least one replaceable surface;
b) wherein said replaceable surface means comprises wear-resister element means for resisting wear of said replaceable surface means when handling the abrasive material;
c) wherein said replaceable surface means comprises magnet means for magnetically attaching said replaceable surface means to the equipment handling abrasive material; and
d) wherein said magnet means comprises permanent attacher means for permanently attaching with said replaceable surface means.

15. The system according to claim 14 wherein said permanent attacher means comprises integral-matrix bond means for integral-matrix bonding of said magnet means with said replaceable surface means.

16. The system according to claim 14 wherein said wear-resister element means comprises ceramic element means for increasing wearability of said replaceable surface means.

17. The system according to claim 3 wherein:
a) said integral-matrix bond comprises rubber; and
b) said at least one magnet comprises a plurality of ceramic magnets.

* * * * *